United States Patent
Liang

(10) Patent No.: US 7,567,437 B2
(45) Date of Patent: Jul. 28, 2009

(54) ASSEMBLY DEVICE FOR POWER SUPPLIES

(75) Inventor: Chien-Fa Liang, Chung-Ho (TW)

(73) Assignee: Super Micro Computer Inc., San Jose, CA (US)

( * ) Notice: Subject to any disclaimer, the term of this patent is extended or adjusted under 35 U.S.C. 154(b) by 343 days.

(21) Appl. No.: 11/501,027

(22) Filed: Aug. 9, 2006

(65) Prior Publication Data

US 2008/0047961 A1 Feb. 28, 2008

(51) Int. Cl.
- *H05K 7/20* (2006.01)
- *H05K 5/00* (2006.01)
- *A47B 77/08* (2006.01)

(52) U.S. Cl. .............. 361/695; 361/693; 454/184; 312/236; 312/223.2; 174/50; 174/547

(58) Field of Classification Search .......... 361/694, 361/695, 692, 696, 724–727; 454/184; 312/236, 312/223.2
See application file for complete search history.

(56) References Cited

U.S. PATENT DOCUMENTS

| 6,038,126 A | * | 3/2000 | Weng | 361/679 |
| 6,078,503 A | * | 6/2000 | Gallagher et al. | 361/725 |
| 6,304,443 B1 | * | 10/2001 | Chou | 361/695 |

* cited by examiner

*Primary Examiner*—Jayprakash N Gandhi
*Assistant Examiner*—Zachary M Pape
(74) *Attorney, Agent, or Firm*—Troxell Law Office, PLLC

(57) ABSTRACT

An assembly device for a power supply is composed of a rectangular case which is provided with a transversal spacer grid in a horizontal direction, with an upper spacer grid and a lower spacer grid being vertically installed above and below the transversal spacer grid, to divide the rectangular case into four rectangular positioning holes; and four rectangular power supplies which are inserted and fitted into the four rectangular positioning holes respectively, such that when the four power supplies start, four fans at their front parts can be activated, thereby allowing air inside and outside the rectangular case to be able to flow uniformly.

3 Claims, 5 Drawing Sheets

ASSEMBLY DEVICE FOR POWER SUPPLIES

BACKGROUND OF THE INVENTION (a) Field of the Invention

The present invention relates to an assembly device for an power supply, and more particularly to an assembly device wherein when four power supplies which are emplaced in a rectangular case start, air can flow in the rectangular case with a superior mobility and uniformity.

(b) Description of the Prior Art

It is known that a conventional power supply is installed at a side of a computer casing; therefore, when the power supply starts, air which is caused by a rotation of an interior fan will not flow with a good uniformity in the computer casing, and an air permeability of the computer casing is not sufficient, which causes an inferior flow and circulation of the air within an interior of the computer casing, thereby further affecting a heat dissipating effect of internal electronic parts.

SUMMARY OF THE INVENTION

The primary object of present invention is to provide an assembly device for a power, supply such that four power supplies can be equally assembled and fitted into a rectangular case, and when the power supplies start, the air can be uniformly flowing within a space of the rectangular case and the power supplies, while the effect of permeability in interchanging with air outside of the rectangular case can be increased.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
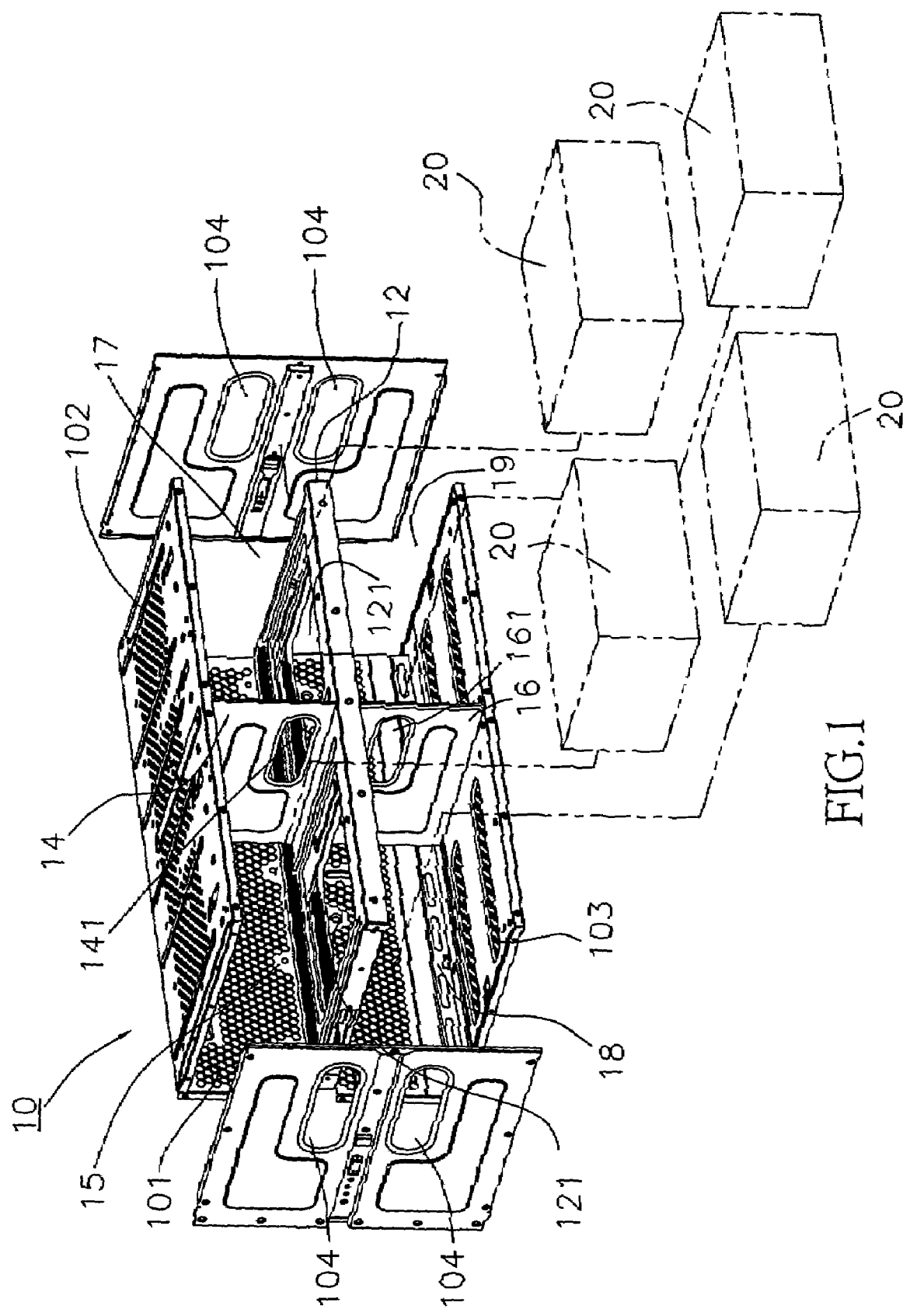
FIG. 1 shows an exploded view of parts of the present invention.
Figure 2:
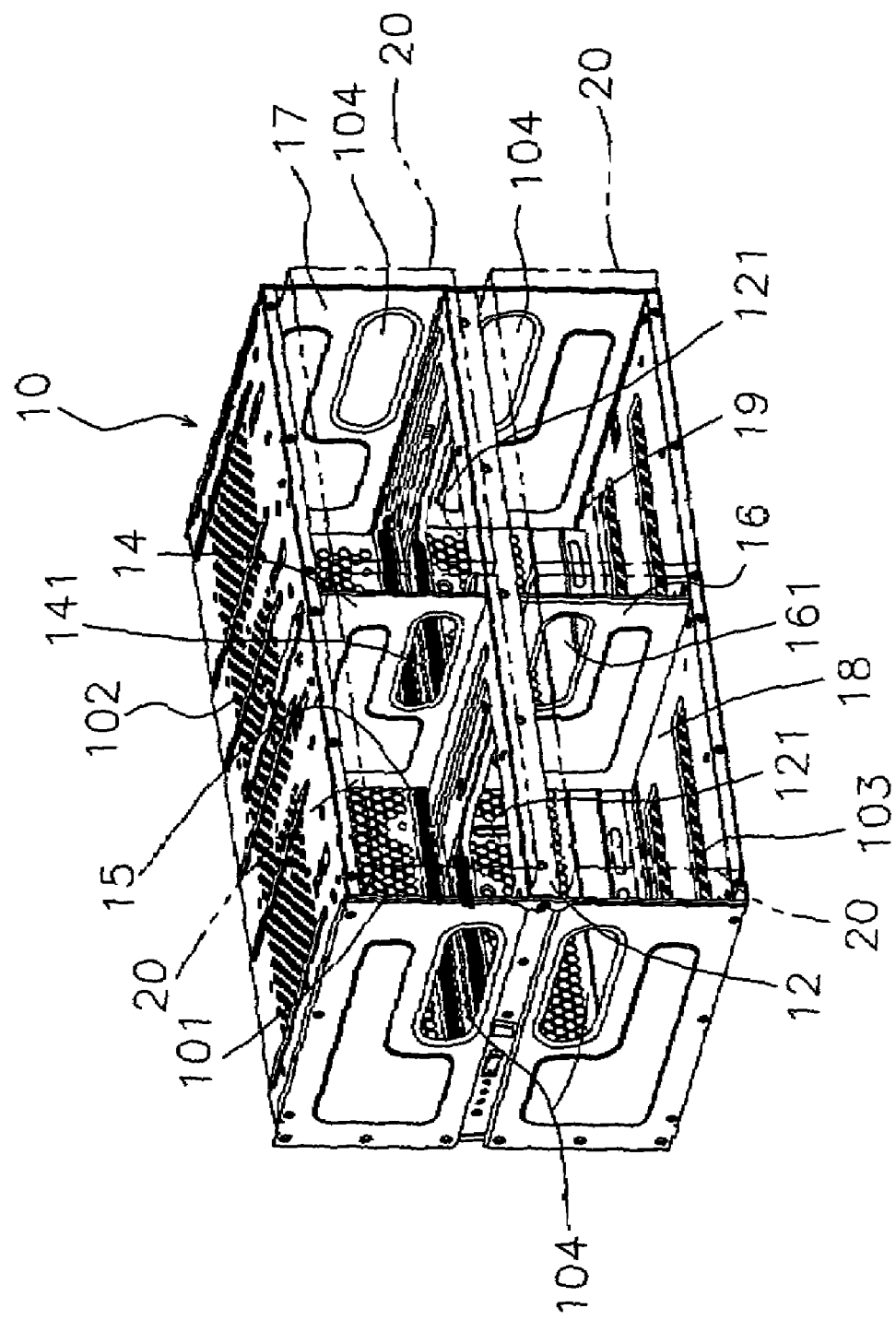
FIG. 2 shows a perspective view of the present invention as in FIG. 1, after being assembled.
Figure 3:
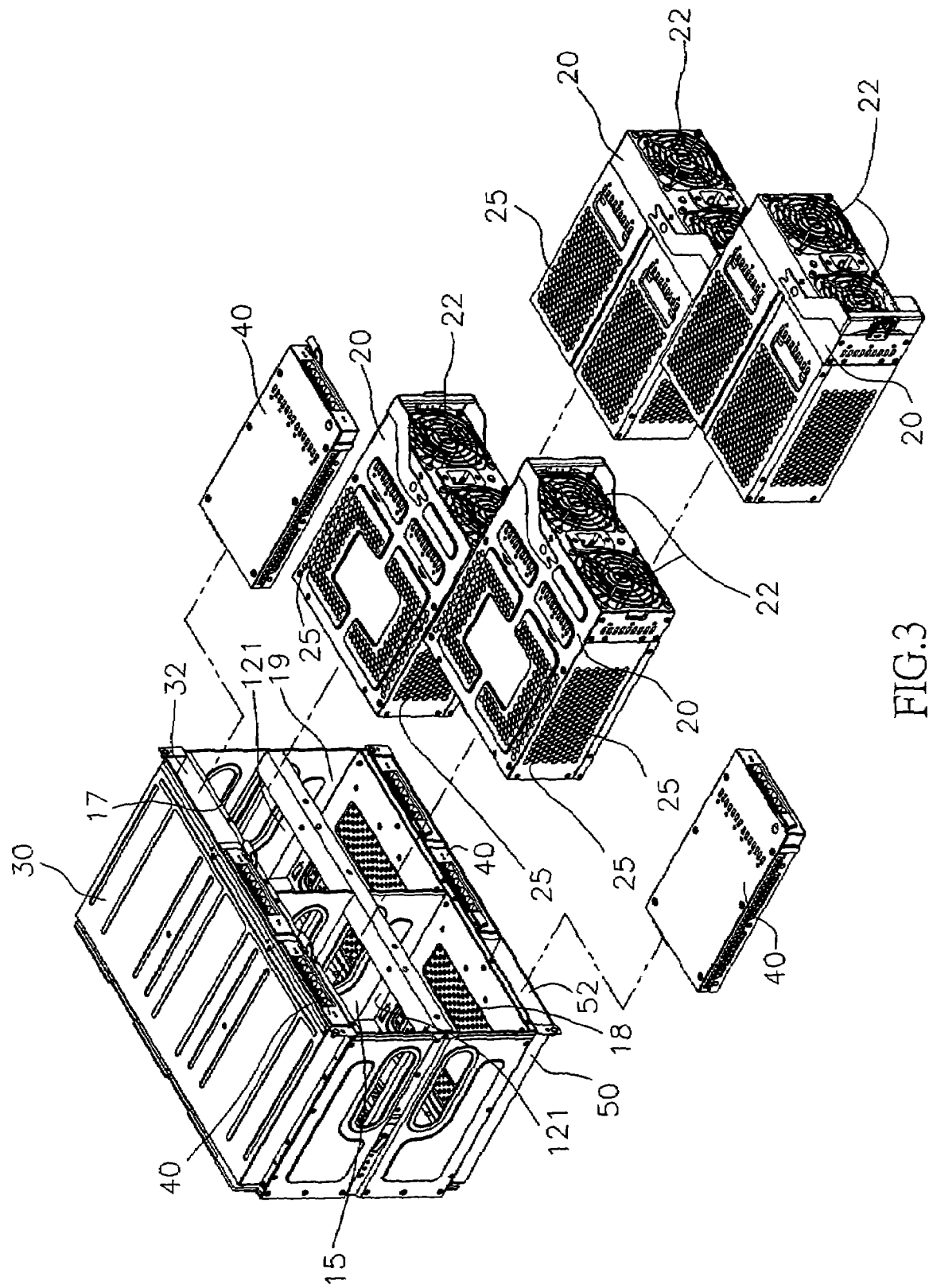
FIG. 3 shows an exploded view of parts of an embodient of the present invention.

Referring to FIG. 1 and FIG. 2, the present invention is to provide an assembly device for a power supply, including a rectangular case 10 which is provided with transversal spacer grid 12 in a horizontal direction, with an upper spacer grid 14 and a lower spacer grid 16 being vertically located above and below the transversal spacer grid 12 respectively, to divide the rectangular case 10 into four rectangular positioning holes 15, 17, 18, 19; and four rectangular power supplies 20 which are inserted into the four rectangular positioning holes 15, 17, 18, 19 respectively, such that when the four power supplies 20 start, four fans 22 at their front parts (as shown in FIG. 3) can be activated to achieve a uniform flow of air inside and outside the rectangular case 10.

As shown in FIG. 1, two rectangular through-holes 121 are located in middles of the transversal spacer grid 12, a back surface of the rectangular case 10 is provided with meshes 101, a top surface of the rectangular case 10 is provided with meshes 102, a bottom surface of the rectangular case 10 is provided with meshes 103, and two side surfaces of the rectangular case 10 are provided with through-holes 104, in order to facilitate the air to access the internal space of rectangular case 10 through the meshes 101, 102, 103, and the through-holes 104, 121.

The upper and lower spacer grids 14, 16 are provided with through-holes 141, 161 to provide for a circulation of the air between the neighboring positioning holes 15, 17, 18, 19.

As shown in FIG. 3, for each power supply 20, a peripheral wall of its case is provided with meshes 25, and an outlet end of its fan 22 is positioned at an outlet end of the positioning hole 15, 17, 18, 19.

Referring to FIG. 1 and FIG. 2, a rectangular case 10 is equally divided into four rectangular positioning holes 15, 17, 18, 19 with an identical shape and an identical size, by upper and lower spacer grids 14, 16. Four rectangular power supplies 20 can be exactly inserted into the four positioning holes 15, 17, 18, 19, and air outlet openings or air suction openings of their fans 22 are all positioned at outlet ends of the positioning holes 15, 17, 18, 19. As shown in FIG. 2 and FIG. 3, when the four power supplies 20 start simultaneously, the four fans 22 are activated to proceed with air suction (or air discharging). As a peripheral wall of the power supply 20 is provided with meshes 25, the air inside the rectangular case 10 will be flowing out towards the air outlet openings of fans 22 along the meshes 25. Referring to FIG. 1 and FIG. 2, as the rectangular case 10 is provided with meshes 101, 102, 103, and through-holes 104, 121, the air inside the rectangular case 10 is connected with the air outside the rectangular case 10. By a design that every one of the four power supplies 20 is interconnected with each other by the through-holes 141, 161 and 121, when the four power supplies 20 are equally allocated and positioned into the rectangular case 10, and the fans 22 of four power supplies 20 are rotating to perform the air discharging (or air suction), a convection is caused between the air inside the four positioning holes 15, 17, 18, 19 within the rectangular case 10 and the air inside the four power supplies 20, through the through-holes 141, 161, 121, with an extremely good uniformity and permeability of circulation.

Figure 4:
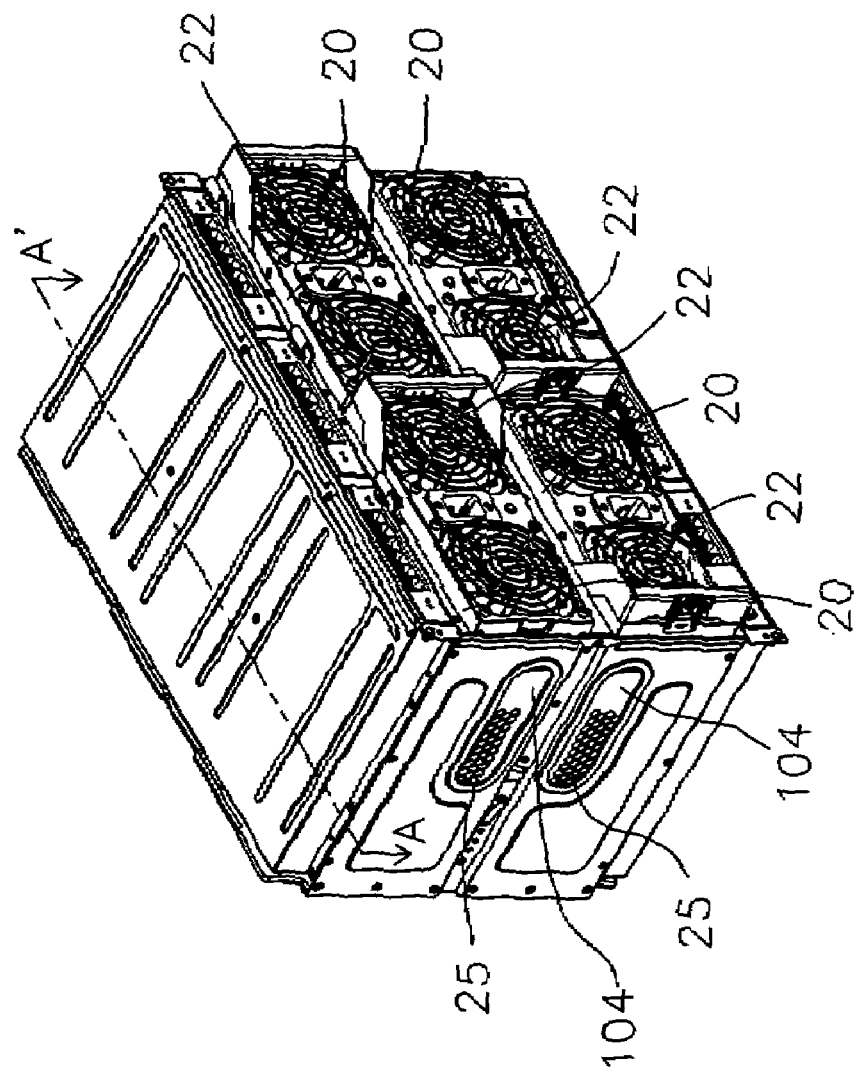
FIG. 4 shows a perspective view of an embodient of the present invention as in FIG. 3, after being assembled.
Figure 5:
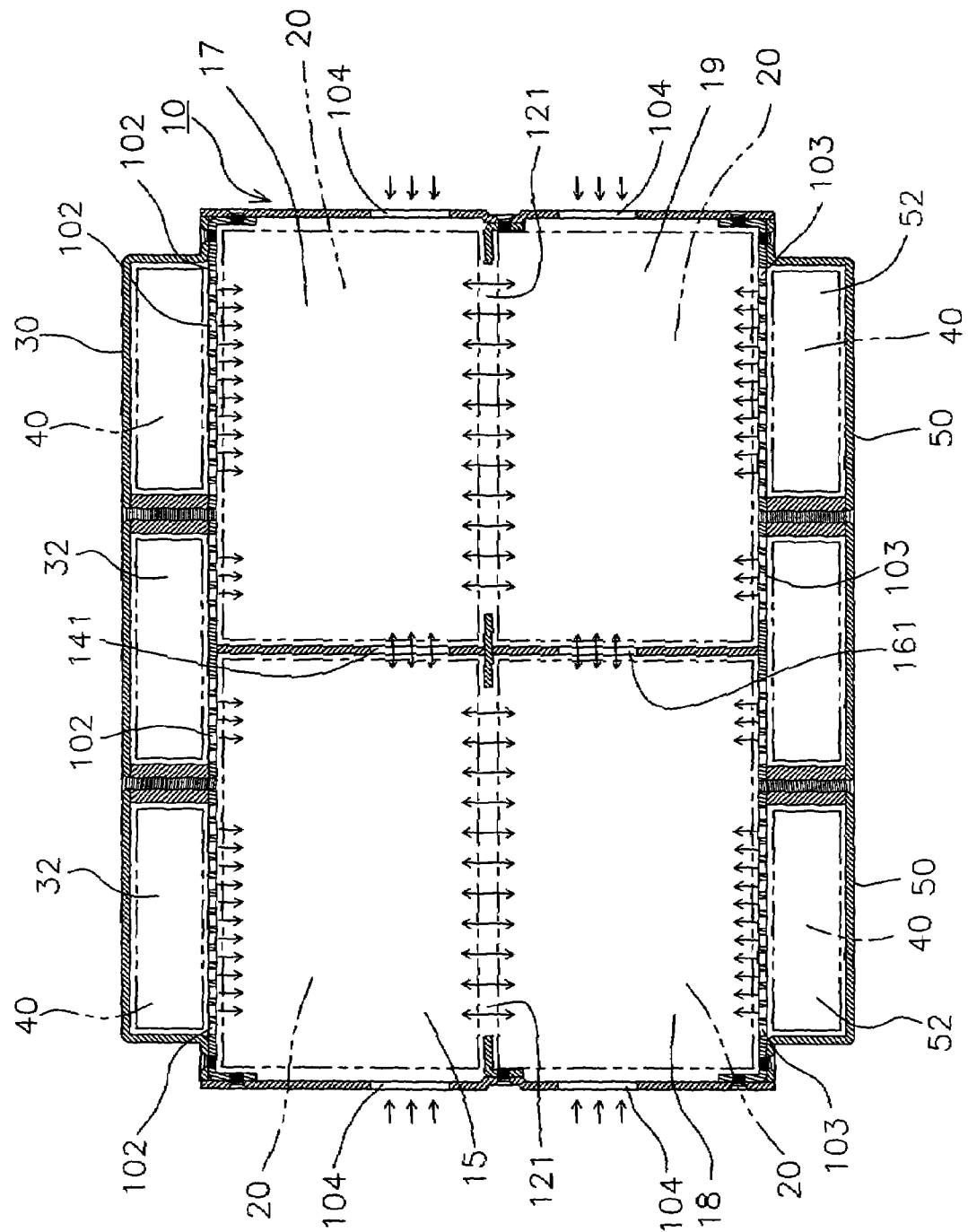
FIG. 5 shows a cutaway view along an A-A' line of FIG. 4.

Referring to FIGS. 3 to 5, a U-shape upper lid 30 can be covered on a top of the rectangular case 10, and at least more than one insertion-hole 32 is formed between the upper lid 30 and a top panel of the rectangular case 10 to provide for an insertion of at least more than one computer module 40 (or server module). A U-shape lower lid 50 can be covered on a bottom of the rectangular case 10, and at least more than one insertion-hole 52 is formed between the lower lid 50 and a bottom panel of the rectangular case 10, to provide for an insertion of at least more than one computer module 40, server module, or other expansion module. At this time, air (as shown by an arrow sign in FIG. 5), in an internal space of the rectangular case 10 can be flowing on a peripheral surface of the computer module 40 through the meshes 101, 102, 103, thereby achieving a purpose of uniformly dissipating heat from a plurality of computer modules 40. The design of through-holes 104 can enable a circulation and permeability between the neighboring power supplies 20, and can allow a human finger to easily grab for facilitating a carrying of the entire rectangular case 10. In addition, the design of through-holes 141, 161 is to increase the air circulation between the neighboring left and right power supplies 20, whereas the design of through-holes 121 is to increase the air circulation between the neighboring top and bottom power supplies 20.

Accordingly, in the present invention, four power supplies 20 are equally inserted into four positioning holes 15, 17, 18, 19 of equal size of the case 10, so as to improve the circulation of air inside and outside the entire case 10, and the uniformity of air flowing inside the case 10. In addition, the effect of uniformly dissipating heat caused by the power supplies 20 and the computer modules 40 which are inserted into the upper and lower insertion-holes 32, 52 of the case 10 can be improved.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An assembly device for a power supply, comprising:
a rectangular case which is provided with a transversal spacer grid in a horizontal direction, with an upper spacer grid and a lower spacer grid being vertically installed above and below the transversal spacer grid respectively, to divide the rectangular case into four rectangular positioning holes; and four rectangular power supplies which are inserted and fitted into the four rectangular positioning holes respectively, such that when the four power supplies start, four fans in their front parts can be activated to achieve a uniform flow of air inside and outside the rectangular case,
wherein middles of the transversal spacer grid are provided with two rectangular through-holes, a back surface of the rectangular case is provided with meshes, a top surface of the rectangular case is provided with meshes, a bottom surface of the rectangular case is provided with meshes, and two side surfaces of the rectangular case are provided with through-holes, in order to facilitate the air to access the internal space of rectangular case through the meshes and through-holes.

2. The assembly device for a power supply according to claim 1, wherein the upper and lower spacer grids are provided with through-holes to provide for a circulation of air between the neighboring positioning holes.

3. The assembly device for a power supply according to claim 1, wherein for each power supply, a peripheral wall of its case is provided with meshes, and an outlet end of its fan is positioned at an outlet of the positioning hole.

* * * * *